United States Patent

Hamilton

[15] 3,644,787

[45] Feb. 22, 1972

[54] UNDERSEA WYE CONNECTION FOR A SUBMARINE CABLE SYSTEM

[72] Inventor: Billy Harold Hamilton, Summit, N.J.

[73] Assignee: Bell Telephone Laboratories, Incorporated, Murray Hill, N.J.

[22] Filed: Dec. 14, 1970

[21] Appl. No.: 97,814

[52] U.S. Cl. ................................317/16, 307/100, 307/318, 317/26, 317/31

[51] Int. Cl. ..........................................................H02h 3/24

[58] Field of Search ..........................317/16, 26, 31; 321/18; 307/66, 100, 318

[56] References Cited

UNITED STATES PATENTS 3,135,910 6/1964 Hamilton.................................321/16

*Primary Examiner*—James D. Trammell

*Attorney*—R. J. Guenther and E. W. Adams, Jr.

[57] ABSTRACT

A simple and reliable diode and avalanche diode network for use at the undersea branch point of a submarine cable system having a main section and two branch sections which permit powering of the repeaters in all three sections under normal conditions. In the event of a trouble condition in a branch, power is continuously and automatically supplied to the main section and the remaining branch.

5 Claims, 2 Drawing Figures

PATENTED FEB 22 1972

3,644,787

INVENTOR
B. H. HAMILTON
BY John P. McDonnell
ATTORNEY

UNDERSEA WYE CONNECTION FOR A SUBMARINE CABLE SYSTEM

BACKGROUND OF THE INVENTION

This invention relates to submarine cable systems and, more particularly, to submarine cable systems having more than two shore or land terminations.

Existing and future submarine cable systems achieve economy by providing many circuits on one cable. For example, the most recent submarine cable in service provides about 800 circuits while those under development are expected to be capable of handling 3,000 circuits. With these high capacities, it is desirable to provide a wye or branching point at an undersea location which allows routing of a portion of the system's channels to different shore or land terminals which may, for example, be in different countries. Since power is transmitted along with signals on the conductors of the submarine cable, both signal and power must be separated at the undersea wye or branching point and then recombined and rerouted in appropriate portions to the cable branches. If branching circuits with a high degree of reliability can be developed for high capacity submarine cable systems, these systems then become quite versatile and, because of their high degree of reliability, more competitive with satellite communications systems.

The power path of the submarine cable system is a series path wherein the constant current shore stations have opposite voltage polarities with respect to ground so as to add. The opposite polarities of the output potentials permit the potentials required by the repeaters to be supplied while preventing excessive voltage stress on the repeaters near the shore terminals. Thus, for example, in a typical two-station system one shore station may have a potential of +5,000 volts with respect to ground while the other station would have a potential of −5,000 volts with respect to ground in a typical two-station system. Since failure in one station in the system implies failure of the entire system, there is no need for alternate methods of powering the undersea repeaters. In a multichannel system, however, it is desirable to maintain proper power and voltage levels at a remaining branch or branches in the event of a failure at a branch.

FIG. 1 illustrates the straightforward approach to this problem suggested by the art in a three-station submarine cable system. The system of FIG. 1 has three stations interconnected by a wye network. Under normal conditions, the switch at the wye connects point F, which corresponds to station F, to ground. The power for each of the repeaters from shore station F to the wye would be supplied only by the shore station F. The power for each of the repeaters between shore stations D and E would be supplied by the combination of these stations as if the system were a two-station system. In the event of a trouble condition in the branch connected to shore station E, the switch at the wye would somehow have to be automatically transferred from point F to point E, and shore station D and shore station F would now be interconnected to supply the power to the repeaters as if the system were a two-station system.

The major disadvantage of the system of FIG. 1 lies in the manner in which the switching may be automatically accomplished at an undersea location with the high degree of reliability required for undersea equipment and with the high voltages of a submarine cable system. Although the obvious component which might be employed for this switching function is a relay, submarine cable engineers both in this country and abroad have found the development of high voltage relays for this purpose to be a formidable task which may ultimately prove to be unsuccessful.

It is therefore an object of this invention to provide a branching circuit for a submarine cable system which has a high degree of reliability.

It is another object of this invention to provide a wye circuit for the power path of a submarine cable system which is implemented with well characterized devices of established reliability.

SUMMARY OF THE INVENTION

The present invention is directed to an undersea branching or wye network which employs a simple diode and avalanche diode network interconnected to permit power to be normally supplied to all cable sections from the grounded land stations connected thereto and automatically provide continuous power from the appropriate land stations for the main and remaining cable section in the event of a failure in a branch section. At the undersea wye network of the present invention, the simultaneously transmitted signal and power are separated into individual distribution paths by blocking capacitors and power separation filters. The separated signal path is then routed to the desired terminating shore station by simple equalizers and hybrid circuitry. The power separation filter connected to the main cable section is connected directly to a common junction while individual diodes connect the power separation filters connected to the branch cable sections to this common junction. A series string of avalanche diodes are connected from the common junction to ground to provide a current path for a current proportional to the current output of at least one of the branch sections under normal operating conditions. During this normal mode of operation, the avalanche diodes are biased in reverse conduction just beyond the knee portion of their reverse voltage-current characteristic by the voltage at the common junction with respect to ground. In the event of a trouble condition in one of the branch cable sections, the voltage at the common junction drops slightly and substantially all the reverse current flow through the avalanche diodes is terminated. The diode in the troubled branch also ceases to conduct and the current flow through the trouble branch is thereby terminated. Power continues to be supplied through the main cable branch and the remaining nontroubled cable branches automatically and without a significant shift in the voltages distributed to the repeaters along the cable. The need for relatively unreliable or complicated switching circuitry, if in fact such circuitry could be developed for an undersea wye network, is thereby eliminated with a simple circuit of predictable high reliability. With the simple and reliable branching network of the present invention, it is now possible for multichannel submarine cable systems to compete favorably with satellite systems.

BRIEF DESCRIPTION OF THE DRAWINGS

Other objects and features of the present invention will readily be apparent from the following detailed description and drawings in which.

DETAILED DESCRIPTION

Figure 1:
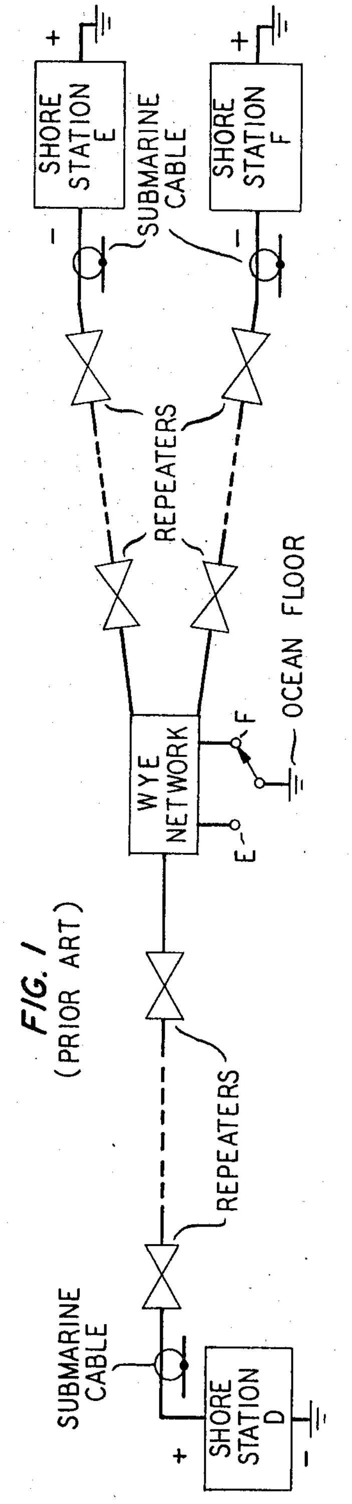
FIG. 1 (PRIOR ART)
FIG. 1 is directed to a straightforward submarine cable system suggested by the art which employs a switching circuit at the branching point as discussed heretofore.
Figure 2:
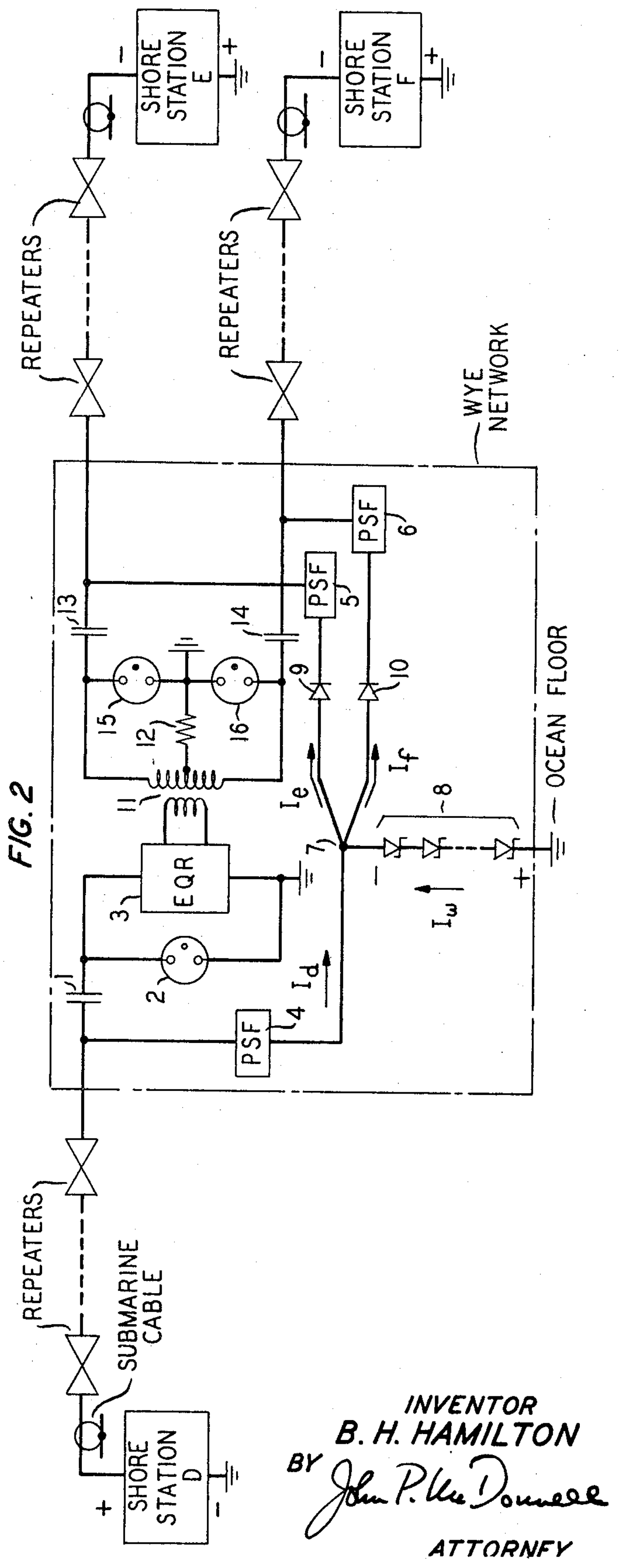
FIG. 2 illustrates a three station submarine cable system with schematic details of a signal and power branching or wye circuit embodying the principles of the present invention.

FIG. 2 of the drawing retains the basic structure of the submarine cable system discussed heretofore in connection with the prior art system of FIG. 1. Three stations of a multistation submarine cable system are shown with shore locations designated as D, E, and F. As represented in the drawing, the distance from shore station D to the wye network would generally be greater than the distances from the shore stations E and F to the wye or branching network. The section of the system from the wye network to shore station D is thus usually referred to as the main section while the sections from the wye network to shore stations E and F are normally referred to as the branch sections. One such shore station which may be employed at shore stations D, E, and F is shown in my U.S. Pat. No. 3,135,910, issued June 2, 1964. Using the same symbolism as in FIG. 1, repeaters are shown connected between each of the shore stations and the wye network.

Signal and power are fed simultaneously along the conductors of the submarine cable system and this combined signal appears at the input of the wye network. The signal portion of the incoming signal is coupled through the capacitor 1 and fed to the gas tube 2 and equalizer 3. The capacitor 1 serves to block high voltage while the gas tube 2 protects passive components against trouble condition power surges. Block 4 represents a power separation filter and therefore is simply labeled as PSF. This power separation filter, and power separation filters 5 and 6, may be any of a large number of compatible components well known to the art and may be as simple, for example, as a single inductor. The power transmitted along the cable is thus fed from the cable via power separation filter 4 to the junction point 7. A string of avalanche diodes 8 is connected from the ocean ground to the junction point 7 with each of the diodes poled for reverse conduction from ground to the junction point 7. Poling the diodes in this manner, such that the current flows from ground into the cathodes of the avalanche diodes, prevents anodic erosion at the physical ground plate on the ocean floor due to the electrolytic action of the ion flow and the salt water solution of the ocean, i.e., the ground plate acts as a cathode and does not erode whereas a ground plate which acts as an anode would eventually erode due to the electrolysis action and disintegrate. Diode 9 is connected, and poled for forward conduction, from the junction point 7 to the power separation filter 5. Power separation filter 5 is in turn connected to the cable of shore station E at a point where it is recombined with the signal portion of the channels to be transmitted to shore station E as discussed hereinafter. Diode 10 is connected, and poled for forward conduction, from the junction point 7 to the power separation filter 6. Power separation filter 6 is connected to the cable at shore station F at a point where it is recombined with the signal portion of the channels to be transmitted to shore station F.

Equalizer 3 may be any one of a number of existing equalizer networks which are compatible with the signal splitting objectives of the wye network illustrated in FIG. 2. The output of the equalizer 3 is connected to one port of the hybrid 11. The equalizer 3 is used to build out the loss of the hybrid to represent a given section of cable loss to the system which, in combination with the distance of the last repeater to the input of the wye, eliminates the need for amplification in the wye. For example, if the normal distance between repeaters in the system is 10 nautical miles, then the distances between the repeater adjoining the wye and the wye may only be 5 nautical miles. Shortening the spacing in this manner thus provides for the signal loss in the wye without requiring an amplifier in this network.

One side of the three-port hybrid 11 is centertapped to ground through a balancing or terminating impedance 12 in the well-known hybrid structure. Capacitor 13 connects the second port of the hybrid 11 to the cable branch to shore station E and capacitor 14 connects the third port of hybrid 11 to the cable branch to shore station F. In the manner well known in the art the hybrid 11 allows routing of a portion of the system's channels to different shore locations in one direction and to combine channels to a single terminating station in the other direction. Both capacitors 13 and 14 block high voltages as does capacitor 1 noted heretofore. Gas tube 15 is connected across the second port output of hybrid 11 to ground and gas tube 16 is connected across the third port output of hybrid 11 to ground. Both gas tubes 15 and 16 serve to protect the passive components against trouble condition power surges as does gas tube 2 discussed heretofore.

The manner in which power is continually supplied to all three cable sections under normal conditions and to the trouble-free branch section and main section of the system during a trouble condition in one branch will now be discussed in detail. Under normal operating conditions each of the shore stations D, E, and F will have approximately equal and constant current outputs. As can be seen from FIG. 2 of the drawing, the current $I_d$ from shore station D flows into the junction point 7, the current $I_e$ from shore station E flows out of the junction 7 as does the current $I_f$ from shore station F. Summing the currents at junction 7 in accordance with Kirchoff's law, we see that the current $I_w$ into the junction 7 through the string of avalanche diodes 8 must also be approximately equal to the constant current from each of the shore stations D, E, and F. The potential at junction 7 will be the sum of the reverse voltage drops across each of the avalanche diodes 8 and will be negative with respect to ground. The number and type of avalanche diodes 8 chosen would be such that the potential at junction 7 and the anodes of diodes 9 and 10 are normally less negative, i.e., more positive, than the potential at the cathode electrodes of diodes 9 and 10. Under normal operating conditions, therefore, diodes 9 and 10 are forward biased and the currents $I_e$ and $I_f$ flow out of junction 7 toward shore stations E and F, respectively. Since the voltage from junction 7 to ground is the sum of the reverse voltages across the avalanche diodes 8, these diodes determine the potential at the junction 7 and the potential distribution for the entire submarine cable system. (As noted heretofore, the potentials in the cable system must be distributed to avoid excessive voltage stress on the repeaters nearest the shore terminals.) It will be noted from FIG. 2 that, as in the prior art system, shore station D has its negative output terminal grounded while shore stations E and F have their positive output terminals grounded. If the wye network were at the exact midpoint of the system, the potential at point 7 might be chosen to be zero or ground. Since, however, the main leg of the system from shore station D will normally be longer than the branch legs to shore stations E and F, the potential at the junction point 7 is fixed at a relatively constant negative potential. The potentials as thus distributed avoid the aforenoted voltage stress at the repeaters nearest the shore stations.

For illustrative purposes, assume that there is a trouble condition in the branch connected to the shore station E. The trouble condition will usually either be in the form of a short circuit or open circuit. If the trouble is an open circuit, no current will flow through the branch cable to shore station E and $I_e$ will drop to zero. If the trouble is a short circuit, on the other hand, the cable is effectively connected to ground which is at a high potential (more positive) than the junction 7 and diode 9 is back biased. Once diode 9 is back biased, no current will flow to the shore station E. Either an open circuit or short circuit trouble condition will therefore open the current path to the shore station E.

Once the trouble condition exists in the branch cable to shore station E, the system attempts to readjust to a new equilibrium point, the voltage at junction 7 will become slightly less negative, and the avalanche diodes 8 will fall out of reverse conduction. (As noted heretofore, the avalanche diodes 8 are normally biased for reverse conduction just beyond the knee of their reverse voltage-current characteristic such that a small change of voltage across the string of diodes will cause them to drop out of reverse conduction.) The change in potential at junction 7 is due to the fact that although attempts are made at all the shore stations to maintain equal constant current outputs, the output currents are in fact neither constant nor equal. Whenever a branch cable current is terminated, therefore, the potential at junction 7 will drop slightly and the potentials in the remaining portions of the system adjust accordingly. Once the avalanche diodes 8 drop out of conduction, the current flow $I_w$ through these diodes drops to the low-reverse leakage current through the diodes which may be, for example, in the neighborhood of 0.1 ma. (If desired the current $I_w$ could be reduced to zero by readjusting the power plants at shore stations D and F to force the voltage across the string of avalanche diodes to zero by, for example, increasing the voltage output of shore station F and decreasing the voltage output of shore station D.) Since the current $I_d$ is now substantially the same as the current $I_f$, this leakage current will be supplied by a slight increase in $I_f$ and a slight decrease in $I_d$. This transition to the new equilibrium point is thus due to the linear current versus voltage output slopes of the power supplies at the shore stations and the abrupt nonlinearity display by the avalanche diodes 8 due to a slight change of voltage across these diodes. With this new equilibrium, the integrity of the submarine cable transmission system from shore station D to shore station F is maintained automatically, with a high degree of reliability, and without the need for switching equipments such as relays.

If desired, the reliability of the submarine cable system of FIG. 2 could be increased by the use of a second series string of avalanche diodes with each of the corresponding diodes in the string being connected in parallel. The failure of any single diode could not then cause failure in the power portion of the wye network. It should also be noted that although the illustrative embodiment of FIG. 2 shows only two branch sections, a greater number of branches may be employed using the power branching techniques of the present invention. In this multibranch system, each branch section of the power circuit would have a diode connected in the manner shown for the diodes 9 and 10 in FIG. 2. The avalanche diodes 8 would handle the increased current due to an additional current supplied by each shore station. In the event of a trouble condition, the diode connected in the power circuit of the troubled branch would cease to conduct and the total current through the avalanche diodes would increase or decrease proportionately depending on the direction of the branch current from the shore station at the junction point, i.e., into or out of the junction. The avalanche diodes in such a multibranch system would be continuously conductive in the reverse direction. Such a system would operate automatically in the event of a failure in one or more branches and with the same high degree of reliability as the present invention.

In summary, then, the present invention is directed to power branching circuitry for an undersea wye network for a submarine cable system having a plurality of branches. The diodes in the power circuits for each of the branches and the main branch are interconnected at a common junction which is connected to ground by a series string of avalanche diodes. The avalanche diodes provide a current path for the current of the branches in excess of the current through the main section of the system. The sum of the voltages across the avalanche diodes is chosen so that each avalanche diode is biased into reverse conduction just beyond the knee of its reverse characteristic. When a trouble condition, which is normally an open circuit or short circuit, occurs in one of the branches, the diode in the branch ceases to conduct, the potential at the common junction falls slightly, and all reverse conduction, except for a small leakage current, through the avalanche diodes is terminated. The linear output characteristics of the power supplies at the shore terminals permit the voltages and currents in the system between the main section and the remaining branch to readjust and a new equilibrium is obtained automatically to maintain continuous service between the main section of the cable and the remaining branch. The present invention thus permits normal operation of the system and at the same time automatically allows transmission between the main section of the cable and the remaining branch while the troubled branch is effectively disconnected from the system. This scheme permits the development of high-capacity submarine cable systems with a high degree of reliability which may compete favorably with satellite systems.

The above-described arrangement is illustrative of the application of the principles of the invention. Other embodiments may be devised by those skilled in the art without departing from the spirit and scope thereof.

What is claimed is:

1. A branching network for a submarine cable system having a main cable section and a plurality of branch cable sections, each of said cable sections being connected to individual grounded land stations for the simultaneous transmission of signal and power between land stations, comprising signal separation means connected to each of said cable sections to couple signals in both directions between said main and branch cables in a predetermined manner, individual power separation means connected to said main cable sections and each of said plurality of branch cable sections, the power separation means of said main cable section being connected between said main section and a common junction, nonlinear voltage responsive means connected between said common junction and ground to provide a path for at least a portion of the current transmitted by said land stations, and a plurality of diode means individually connected between each of said individual power separation means connected to each of said plurality of branch cable sections and said common junction, each of said diode means being responsive to a trouble condition in their respective branch to terminate the current flow through that branch thereby proportionally reducing the current flow through said nonlinear voltage responsive means.

2. A branching network for a submarine cable system having a main cable section and two branch cable sections, each of said cable sections being connected to individually grounded land stations for the simultaneous transmission of signal and power between land stations, comprising signal separation means connected to each of said cable sections to couple signals in both directions between said main and branch cables in a predetermined manner, power separation means connected to each of said cable sections, first and second diode means connected respectively to the power separation means connected to said first and second branch cable sections, means connecting said main cable section power separation means, and said first and second diode means at a common junction, and nonlinear voltage responsive means connected between said common junction and ground to provide a current path for at least a portion of the current transmitted by said land stations under normal conditions and substantially terminate said current path in the event of a trouble condition in one of said branches, said first and second diode means being responsive to a trouble condition in their respective branch so as to terminate current flow through the troubled branch.

3. A branching network for a submarine cable system in accordance with claim 2 wherein said nonlinear voltage responsive means comprises a series string of avalanche diodes which are normally biased beyond the knee portion of their voltage-current characteristic in reverse conduction and short of the knee portion of the voltage-current characteristic in the event of a trouble condition in one of said branches to terminate substantially all reverse conduction through said avalanche diodes.

4. A branching network for a submarine cable system in accordance with claim 3 wherein the voltage output of said land station connected to said main cable section has a positive polarity with respect to ground, and the voltage output of said branch cable land stations have a negative polarity with respect to ground, said first and second diode means comprising individual diodes poled for forward conductivity from said common junction to said respective power separation means.

5. A branching network for a submarine cable system having a main cable section and two branch cable sections, each of said cable sections being connected to individual grounded land stations for the simultaneous transmission of signal and power between land station, comprising signal separation means connected to each of said cable sections, an equalizer connected to the signal separation means connected to said main cable section, a three port hybrid network having one port connected to said equalizer, a second port connected to one of said branch cable sections, and a third port to the remaining branch section to couple signals between the main and branch sections in a predetermined manner, an individual power separation filter connected to each of said cable sections, first and second diodes each having one of their electrodes individually connected to the said power separation filter connected respectively to said first and second branch cable sections, means connecting said main cable section power separation filter and the remaining electrode of said first and second diodes at a common junction, and string of series connected avalanche diodes connected from said common junction to ground and normally biased for reverse conduction to provide a current path for a current proportional to the current in one of said branches, said avalanche diodes being biased in the event of a trouble condition in one of said branches so as to terminate substantially all of the reverse conduction therethrough, said first and second diodes being poled to be responsive to a trouble condition in their respective branches so as to terminate current flow through a respective branch without interfering with transmission through the remaining branch and said main branch.

* * * * *